United States Patent
Cheng

[11] 3,975,504
[45] Aug. 17, 1976

[54] PRODUCTION OF CARBON BLACK FROM COAL

[75] Inventor: Paul J. Cheng, Bartlesville, Okla.

[73] Assignee: Phillips Petroleum Company, Bartlesville, Okla.

[22] Filed: June 2, 1975

[21] Appl. No.: 583,317

Related U.S. Application Data

[63] Continuation-in-part of Ser. No. 393,492, Aug. 31, 1973, abandoned.

[52] U.S. Cl. .............. 423/449; 423/450; 423/455; 423/456; 23/259.5
[51] Int. Cl.² .............................. C09C 1/50
[58] Field of Search .......... 423/449, 450, 455, 456; 23/259.5

[56] References Cited
UNITED STATES PATENTS

| | | | |
|---|---|---|---|
| 2,656,254 | 10/1953 | Heller | 423/456 |
| 2,716,053 | 8/1955 | Mayland | 423/459 |
| 3,073,681 | 1/1963 | Ceresna | 423/450 |
| 3,076,695 | 2/1963 | Claassen et al. | 433/455 |
| 3,175,888 | 3/1965 | Krejci | 423/450 |
| 3,404,960 | 10/1968 | Mansfield | 423/449 |
| 3,424,556 | 1/1969 | Johnson | 423/449 |
| 3,728,437 | 4/1973 | VanderVeen | 423/450 |
| 3,773,904 | 11/1973 | Iyengar et al. | 423/449 |

FOREIGN PATENTS OR APPLICATIONS

| 3,816,107 | 9/1961 | Japan | 423/449 |
|---|---|---|---|

Primary Examiner—Edward J. Meros

[57] ABSTRACT

A method and apparatus for producing carbon black by pyrolytic decomposition of coal with hot combustion gases. In a cylindrically shaped vertical reactor coal is tangentially introduced, thus establishing a helically flowing mass of pulverized coal. This mass is contacted with hot combustion gases. Fine ashes are withdrawn from the upper portion of the reactor at the periphery and coarse ashes are withdrawn from the lower portion of the reactor from the periphery. Carbon black-containing gases are withdrawn from the area of the vertical axis of the reactor overhead.

5 Claims, 2 Drawing Figures

PRODUCTION OF CARBON BLACK FROM COAL

This application is a continuation-in-part of my co-pending application Ser. No. 393,492, filed Aug. 31, 1973, now abandoned.

This invention pertains to the production of carbon black from coal. In one of its more specific aspects, this invention pertains to a method and apparatus for the production of carbon black from coal, the carbon black containing minimal quantities of ash.

The production of carbon black from coal is well known from such prior art as that disclosed in U.S. Pat. No. 3,424,556, the disclosure of which is incorporated herein by reference, the operating conditions of temperature and pressure of that method being employable in the method of the present invention. Using pulverized coal as a feed to a carbon black reactor becomes increasingly attractive as liquid hydrocarbon feedstock prices increase.

The formation of carbon black from coal involves an initial decomposition of the coal to tar, ash, and gaseous hydrocarbons. The tar hydrocarbons are subsequently dehydrogenated and the carbon aggregated to form carbon black. In contrast, in the production of carbon black from a liquid hydrocarbon, because the hydrocarbon need not be converted first to tar, the use of coal requires a longer residence time. Relatedly, the residence time of the product black in the reactor must be prolonged to enable separation of the ash from the carbon black.

The method and apparatus of this invention are particularly suited for these purposes. In accordance with this invention a helically flowing mass of pulverized coal is established in a cylindrical reactor, this pulverized coal is contacted with hot combustion gases, and the carbon black-containing smoke is withdrawn overhead along the vertical axis of the reactor. Because of the centrifugal forces established within the chamber, only minimal quantities of ash will move into the central vortex area of the chamber and so only minimal quantities of ash will be mixed with the carbon black and removed upwardly from the chamber. A prolonged residence time of the coal particles is achieved inasmuch as only a limited quantity of ash will be removed from a reactor through upper and lower ash removal ports.

In accordance with this invention there is thus provided a method for producing carbon black from coal comprising introducing pulverized coal suspended in a suspending stream of oxidant gas tangentially through the periphery of a vertically positioned reactor to establish the coal as a helically flowing mass proximate the wall of the reactor, introducing hot combustion gases formed by the combustion of fuel gas and an oxidant gas, as well as primary oxidant gas upwardly into the reactor toward the locus of introduction of the coal, forming a mixture comprising the coal and the hot combustion gases, reacting the mixture to produce carbon black and ash from the coal, passing the carbon black inwardly toward the vertical axis of the reactor, introducing secondary oxidant gas upwardly along the vertical axis of the reactor into contact with the carbon black to increase the photelometer of the carbon black, withdrawing a first stream comprising ash formed in the reacting step tangentially through the periphery of the reactor proximate to the upper terminus of the reactor, withdrawing a second stream comprising ash formed in the reacting step tangentially through the periphery of the reactor proximate the lower terminus of the reactor and withdrawing carbon black overhead from the reactor along the vertical axis of the reactor.

In accordance with one presently preferred embodiment of this invention, fuel gas is introduced into the reactor through a separate inlet close to the inlet of the coal. This separate inlet can be located as a nozzle inside of the entry port of the coal. This additional fuel gas is ignited and combusted in the reactor and serves to preheat the coal.

The present invention can be carried out employing any kind of pulverized coal. Presently preferred are coals selected from the group consisting of anthracites, semianthracites, bituminous and semibituminous coals, and mixtures thereof. The coal is preferably comminuted to at least 200 to 400 mesh (U.S. sieve) although particles smaller than 400 mesh can be employed. The coal preferably has a moisture content of less than 3 weight percent of water and a maximum ash content of less than about 15 weight percent. In the presently preferred embodiment the coal will have been ground and/or charred to a state in which it will almost begin to agglomerate.

Throughout this specification the term "oxidant gas" is to be understood to be a gas selected from the group consisting of air, oxygen-enriched air and oxygen.

"Hot combustion gases" in this specification means the combustion product of a gaseous fuel, e.g., natural gas, and an oxidant gas. In every instance where hot combustion gases are introduced into the reactor it is to be understood that essentially two different possibilities are encompassed. First, the hot combustion gases can be produced outside of the reactor and can then be introduced into the reactor. Second, the gaseous fuel and the oxidant gas can be separately introduced into the reactor and combusted in the reactor. The second possibility is generally preferred since hot combustion gases do not have to be passed through conduits.

The quantity of gaseous fuel introduced as hot combustion gases into the reactor is sufficient to supply from about 3300 to about 4600 BTU per pound of coal introduced. From this value the quantity of gaseous fuel to be introduced can readily be determined from the number of BTU's per standard cubic foot of the gaseous fuel and the number of pounds of coal used.

The pulverized coal in the carrier oxidant gas is tangentially introduced into the reactor. The axial location of the tangential introduction port for the coal through the circumferential periphery of the reactor is proximate the midpoint of the vertical axis of the chamber. The coal is introduced through at least one pair of conduits opening tangentially into the reactor in order to establish the mass of helically flowing pulverized coal.

Both the hot combustion gases and the primary oxidant gas are introduced into the reactor through its periphery and in axially upward direction from orifices located below the locus of introduction of the coal. These gases are moved upwardly so as to maintain the coal and ash as floating particles within the reaction zone and to prolong the residence time of the carbon in the reactor.

The primary air can be introduced through separate inlets. It is, however, within the scope of this invention to introduce the hot combustion gases into the reactor together with the primary air. In the latter case oxygen-rich hot combustion gases are introduced into the reactor which means that more oxidant is introduced than necessary for a stoichiometric combustion of the gaseous fuel. The surplus of remaining gaseous oxidant then constitutes the primary gaseous oxidant.

The total quantity of gaseous oxidant to gaseous fuel is above the range stoichiometrically necessary. In the case of the use of natural gas as the gaseous fuel and air as the oxidant gas, this ratio will be in the range of about 13:1 to about 19:1 SCF of air per SCF of natural gas. The total quantity of oxidant gas encompasses both the primary oxidant gas and the oxidant gas which is used as the reactant to produce the hot combustion gases.

The discharge rate of the primary oxidant and the hot combustion gases in the reactor is within the range of about 10 to about 20 ft./sec. so as to have a velocity of these gases within the range of about 3 to about 7 ft./sec. at a distance of about 1 ft. from the nozzles through which the gases are introduced into the reactor. Preferably the gaseous oxidant is introduced upwardly into the reactor in the absence of simultaneous introduction therewith of any fuel. Thus the combustion of the fuel occurs in the reactor. In either instance the gaseous oxidant will be introduced at a rate to produce a zone between the carbon black withdrawal outlet and the inner wall of the reactor in which the helically flowing gases are at a velocity within the range of about 40 to about 100 ft./sec.

The secondary oxidant gas introduced upwardly along the vertical axis of the reactor will be introduced in a quantity sufficient to adjust the photelometer of the carbon black to the desired value. Preferably the secondary gaseous oxidant will be introduced in an amount within the range of about 4 to about 16 SCF per pound of coal. More importantly, however, the secondary gaseous oxidant will be introduced along the vertical axis of the reactor in a plurality of jet streams. The discharge velocity of these jet streams is within the range of about 20 to about 80 ft./sec. As this secondary gaseous oxidant moves upwardly along the vertical axis of the reactor, during which time the carbon black moves inwardly toward it, the velocity of the secondary gaseous oxidant column will be within the range of about 8 to about 30 ft./sec. at a distance of about 2 feet from the locus of discharge of these jets.

The carbon black reactor is adapted with at least two pairs of ash removal ports. One pair of ports proximate the wall closing the upper end of the chamber opens tangentially from the chamber through its circumferential periphery and is used to remove the fine ash. At least one second pair of ports is positioned proximate the wall closing the lower end of the chamber, the ports opening tangentially from the chamber through its circumferential periphery and being used to remove the coarse ash.

The coal flowing in a helically moving layer from the ports of introduction is contacted with the hot combustion gases which are introduced radially through the periphery of the reactor and upwardly toward the locus of introduction of the coal. The coal is contacted with the hot combustion gases to produce carbon black and ash. The carbon black passes inwardly from the helically flowing mass into the core area of the reactor. The carbon black-containing gas is then withdrawn from the reactor through an exit conduit opening from the reactor along the vertical axis thereof in upward direction. The carbon black-containing gas thus is removed overhead from the reactor.

The method and apparatus of this invention will be further understood by referring to the attached drawing illustrating a preferred embodiment of the invention.

Figure 1:
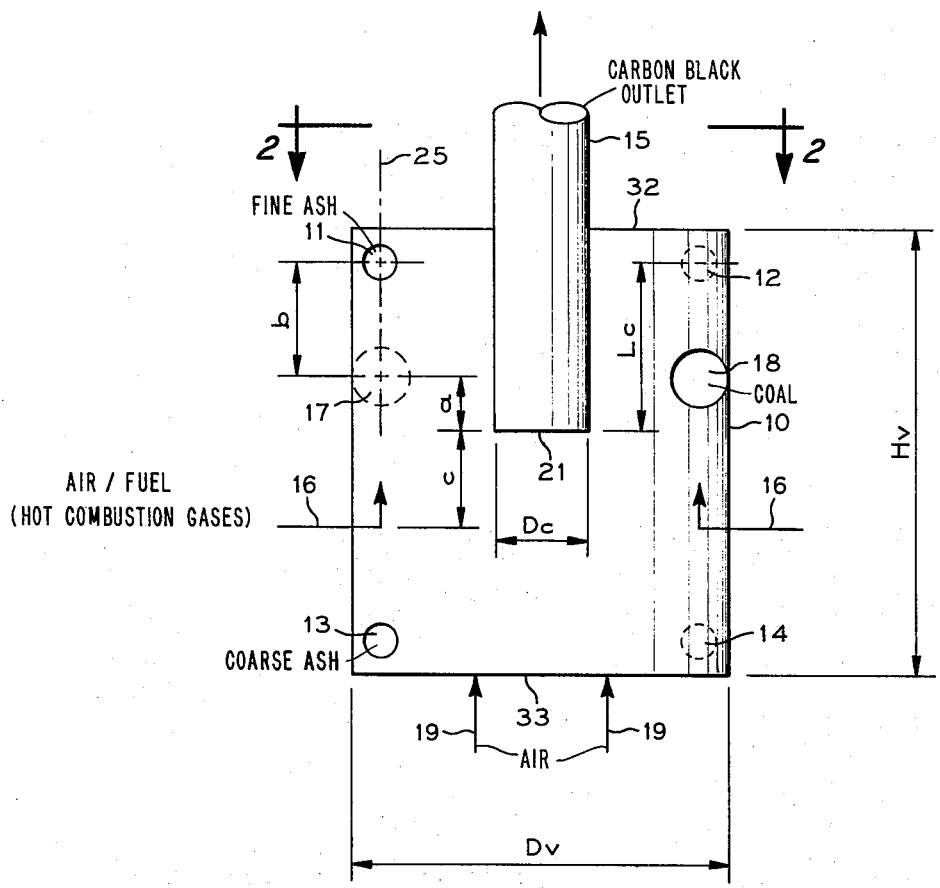
FIG. 1 is a view in elevation of the reactor.

Referring now to the drawings there is shown the reactor which will be comprised of a preferably circular chamber 10 having a diameter Dv and a height Hv.

The chamber will be adapted with at least one of coal-introductory ports 17 and 18 which will open tangentially into the chamber at a locus located a distance above the entrance 21 into carbon black smoke outlet conduit 15. Carbon black smoke outlet conduit 15 will have a diameter Dc and its entrance 21 will be located a distance Lc vertically downwardly from at least one of fine ash exit ports 11 and 12. These ports will open tangentially from the chamber through its outer periphery at a distance $b$ above the tangential-opening coal introductory ports 17 and 18. Ports 17 and 18 will open into the vessel to discharge coal in a first, for example, counterclockwise direction as viewed in FIG. 2; at least one of ports 11 and 12, also, will open from the vessel proximate the upper wall to discharge fine ash from the vessel in the first, or counterclockwise, direction as viewed in FIG. 2.

Figure 2:
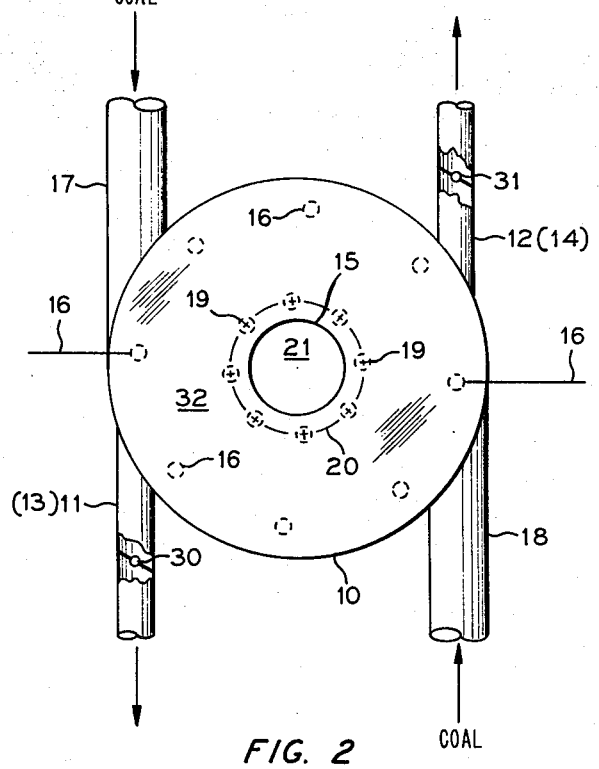
FIG. 2 is a plan view of the reactor through section 2—2 of FIG. 1.

Opening into the chamber at a distance $c$ below entrance 21 of conduit 15 will be at least one conduit 16 through which oxidant gas, namely air, oxygen, or oxygen-enriched air, is introduced. Gaseous fuel is preferably introduced through separate conduits. As indicated earlier, however, it is also possible to introduce the hot combustion gases through conduits 16. These conduits discharge upwardly into the chamber at a plurality of loci as shown in FIG. 2 and will discharge, preferably no farther from the wall of the chamber than is a vertical center line 25 through, and common to, conduit ports 11 and 17 and through, and common to ports 12 and 18.

Conduits 13 and/or 14 are at least one coarse ash exit port opening tangentially from the chamber through its circumferential periphery in that direction in which fine ash exit ports 11 and 12 exit from the chamber at a locus just above the lower closing wall of the chamber.

Opening into the chamber through its lower wall is at least one secondary air inlet port 19. Preferably a plurality of such ports will open upwardly into the chamber in any suitable number, preferably four or more, on a common circle 20 which will be positioned as defined hereinafter relative to the diameter of carbon black outlet conduit 15.

As stated previously, only a limited quantity of ash will be removed from the chamber through the ash removal ports in order to control the residence time of the reactants within the reaction chamber. A residence time of up to two seconds will be required and this residence time is controlled by butterfly, or choke, valves 30 and 31 positioned in the ash removal conduits opening from the vessel. Relatedly, since large quantities of coal fines or ash are undesired in the carbon black product, the product is monitored to facilitate adjustment of the valves in the ash outlet lines. The valves in the ash outlet lines 11 and 12 can be positioned as shown by valves 30 and 31 of FIG. 2, the corresponding valves in conduits 13 and 14 not being shown but being similarly designed and positioned.

While variations from the dimensions and ranges set forth herein are feasible, the following ranges will serve to facilitate the design of reactors within the ranges given.

Chamber 10 will have a diameter of from about 3 to about 7 feet and a height of from about 10 to about 30 feet.

Coal introductory ports 17 and 18 will be from about 6 to about 15 inches in diameter and will be positioned from about 2 to about 6 feet above entrance 21 into conduit 15.

Conduit 15, the carbon black outlet conduit, will have a diameter of from 1 to about 2 feet and will extend downward from wall 32 closing the upper end of the chamber by a distance within the range of from 5 to 14 feet.

Conduits 11 and 12 which will serve as fine ash exit ports will vary in number from about 2 to about 8 and will have diameters of from 1 to 4 inches and be positioned, centerline to centerline, a distance of from about 3 to about 8 feet above ports 17 and 18.

Conduits 13 and 14 which will serve as coarse ash exit ports will vary in number from about 2 to about 8 and will be positioned with their downstream wall coincident with the lower wall 33 of the chamber and will have a diameter of from 2 to about 6 inches.

Conduits 16 which serve as primary air and fuel entry ports can vary from about 4 to about 16 in number and will be positioned to discharge upwardly from a locus positioned from about 3 to about 9 feet below entrance 21 of conduit 15.

Conduits 19, which serve as secondary air inlets, can vary from about 4 to about 16 in number and will be positioned a distance of from about ¼ foot inside the projected circumference of conduit 15 to about ⅓ foot outside the projected circumference of conduit 15.

While, in the previous discussion, air and fuel are considered as being introduced into the reactor, it is to be understood that they can be introduced in the form of hot combustion gases formed by the oxidation of the fuel with the air, or other gaseous oxidant.

In a preferred embodiment of this chamber, which will be operable under the conditions defined below, the chamber will have a diameter of 4.5 feet and a height of 16 feet. carbon black will be removed through one 1-¼ foot diameter conduit extending downwardly into the chamber a distance of about 8 feet.

Pulverized coal and air will be introduced through two 10 inch diameter conduits positioned 3 feet above the entrance into the carbon black outlet conduit. Fuel will be introduced through a separate conduit inside of said 10 inch diameter conduit.

Two fine ash exit ports will be provided, these being 1-½ inches in diameter and being located a distance of about 8 feet above the entrance into the carbon black outlet conduit.

Two coarse ash exit ports will be provided, these being 3 inches in diameter and being located with their upstream walls coincident with the lower wall of the chamber.

Eight primary air and fuel entry ports of 2 inches diameter will be provided, these being equally spaced around the chamber and discharging on a locus about 5 feet below the entrance into the carbon black outlet conduit.

Eight secondary air inlet ports will be provided, these being equally spaced around the chamber on the circle having the circumference of conduit 15, the circle coinciding with the projection of conduit 15. These secondary air inlet ports will have a diameter of 1 inch, and will be positioned to discharge at about floor level.

Employing the reactor described in the preferred embodiment, under the preceding conditions, feeding semibituminous coal continuously into the chamber, calculated operating and production conditions will be as follows:

| | |
|---|---|
| Coal Charged | |
| Pounds per hour | 1600 |
| Mesh | 200–400 |
| Residence time, sec. | 1¼ |
| Air and Fuel | |
| With Coal Through Ports 17 and 18 | |
| Air, SCFH | 75,000 |
| Fuel, (Natural Gas) SCFH (through a separate pipe) | 4,400 |
| Via Conduits 16, as Hot Combustion Gases | |
| Air, SCFH (primary air and air necessary to combust the fuel) | 25,000 |
| Fuel, (Natural Gas) SCFH (through a separate pipe) | 1,660 |
| Air Via Conduits 19 | |
| Air, SCFH (secondary) | 8,000 |
| Production | |
| Fine Ash, Lbs./Hr. | 50 |
| Gases with Fine Ash, SCFH | 1,000 |
| Coarse Ash, Lbs./Hr. | 180 |
| Gases with Coarse Ash, SCFH | 4,000 |
| Operating Conditions | |
| Temperature, °F | 2300–2700 |
| Pressure, psia | 19 |
| Smoke | |
| Gases, SCFH | 120,000 |
| Carbon Black, Lbs./Hr. | 620 |
| Carbon Black Properties (Estimated) | |
| Nitrogen Surface Area, m²/gm. | 80 |
| Dibutylphthalate No., DBP, cc/100 g. | 105 |
| Photelometer | 90 |

The reactor will be operated by introducing hot combustion gases into a suitably insulated reactor. The insulating material preferably is silmanite. When the reactor temperature reaches about 2700° F the pulverized coal is introduced in an air stream and the introduction of secondary air will be made simultaneously. The valves in the ash outlet conduits will be regulated to provide a maximum residence time. The quantity of pulverized coal introduced will then be increased until the carbon black contains a maximum-allowable quantity of ash, the quantity of secondary air, which can be preheated as can any of the other of the reactants, being increased until the carbon black has the desired photelometer. The carbon black, in the form of smoke, can be quenched and recovered from the smoke in the conventional manner.

Reasonable variations and modifications, which will be apparent to those skilled in the art, can be made in this invention without departing from the spirit and scope thereof.

I claim:

1. A method of producing carbon black from coal comprising
   a. introducing pulverized coal suspended in a suspending stream of oxidant gas tangentially through the periphery of a vertically positioned reactor to establish said coal as a helically flowing mass proximate the wall of said reactor;
   b. introducing
      aa. hot combustion gases formed by the combustion of fuel gas and an oxidant gas; as well as
      bb. primary oxidant gas upwardly into said reactor toward the locus of introduction of said coal;
   c. forming a mixture comprising said coal and said hot combustion gases;

d. reacting said mixture to produce carbon black and ash from said coal;
e. passing said carbon black inwardly toward the vertical axis of the reactor;
f. introducing secondary oxidant gas upwardly along the vertical axis of said reactor into contact with said carbon black to increase the photelometer of said carbon black;
g. withdrawing a first stream comprising ash formed in step (d) tangentially through the periphery of said reactor proximate to the upper terminus of said reactor;
h. withdrawing a second stream comprising ash formed in step (d) tangentially through the periphery of said reactor proximate the lower terminus of said reactor;
i. withdrawing carbon black overhead from said reactor along the vertical axis of said reactor.

2. The method of claim 1 in which said oxidant gas is air and the ratio of air introduced in step (b), consisting of oxidant air and primary air, to fuel introduced in step (b) is in the range of 13 SCF air per SCF of fuel to 19 SCF air per SCF of fuel and said fuel is introduced in such a quantity to supply about 3300 to about 4600 BTU per pound of said coal introduced.

3. The method of claim 1 in which said secondary oxidant is air which is introduced in a quantity of about 4 to about 16 SCF per pound of coal introduced into the reactor.

4. A method in accordance with claim 2 wherein said primary air is introduced into said reactor at a velocity within the range of about 10 to about 20 ft./sec.

5. A method in accordance with claim 3 wherein said secondary oxidant is introduced in a plurality of streams at a velocity within the range of about 20 to about 80 ft./sec.

* * * * *